(No Model.) 5 Sheets—Sheet 1.

J. P. ROGERS.
RECORDING SHIP'S LOG AND COURSE INDICATOR.

No. 536,582. Patented Mar. 26, 1895.

WITNESSES:
Chas. Nida.
N. B. Hutchinson

INVENTOR
J. P. Rogers
BY
Munn & Co
ATTORNEYS.

(No Model.) 5 Sheets—Sheet 2.
J. P. ROGERS.
RECORDING SHIP'S LOG AND COURSE INDICATOR.
No. 536,582. Patented Mar. 26, 1895.
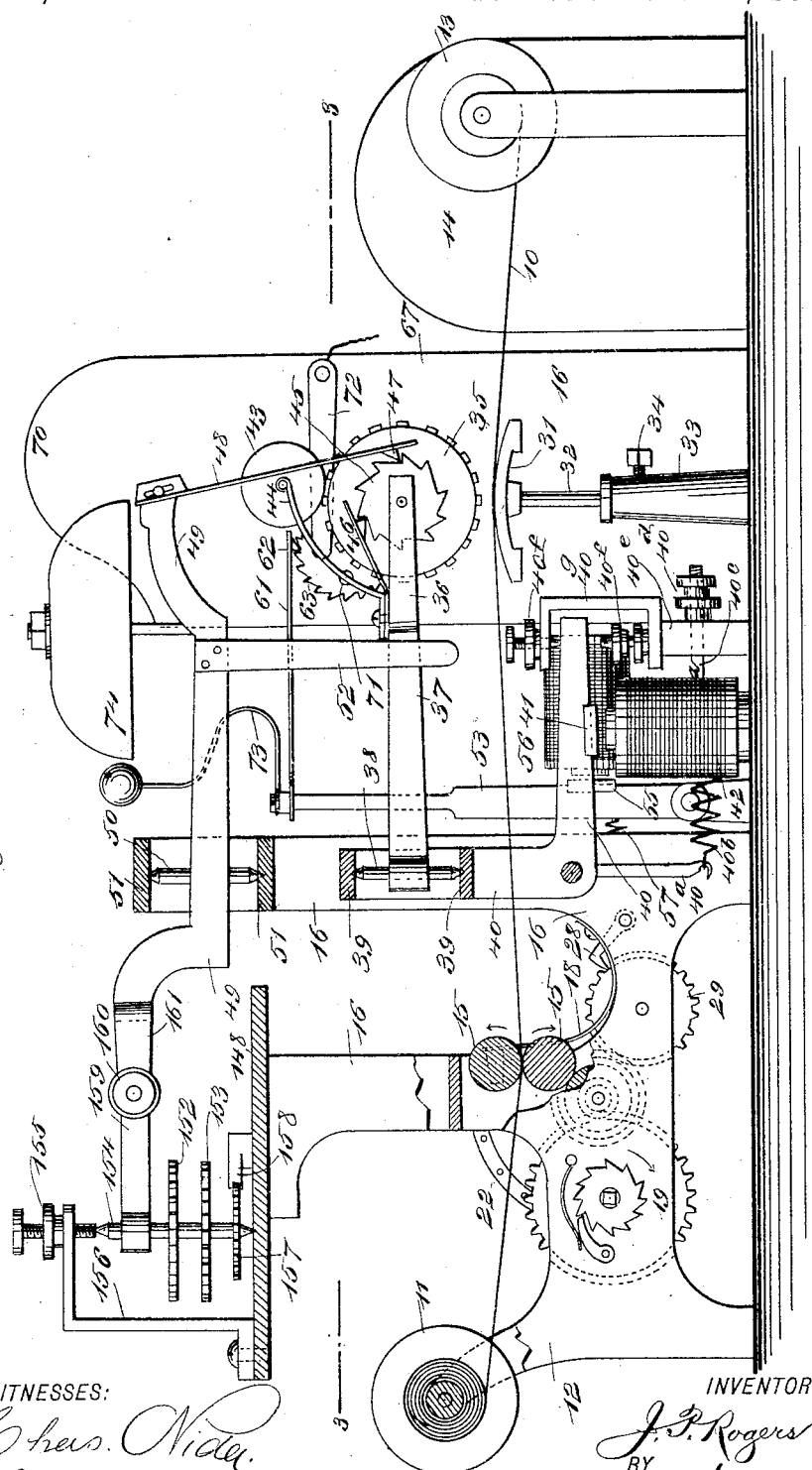

(No Model.) 5 Sheets—Sheet 3.
J. P. ROGERS.
RECORDING SHIP'S LOG AND COURSE INDICATOR.
No. 536,582. Patented Mar. 26, 1895.
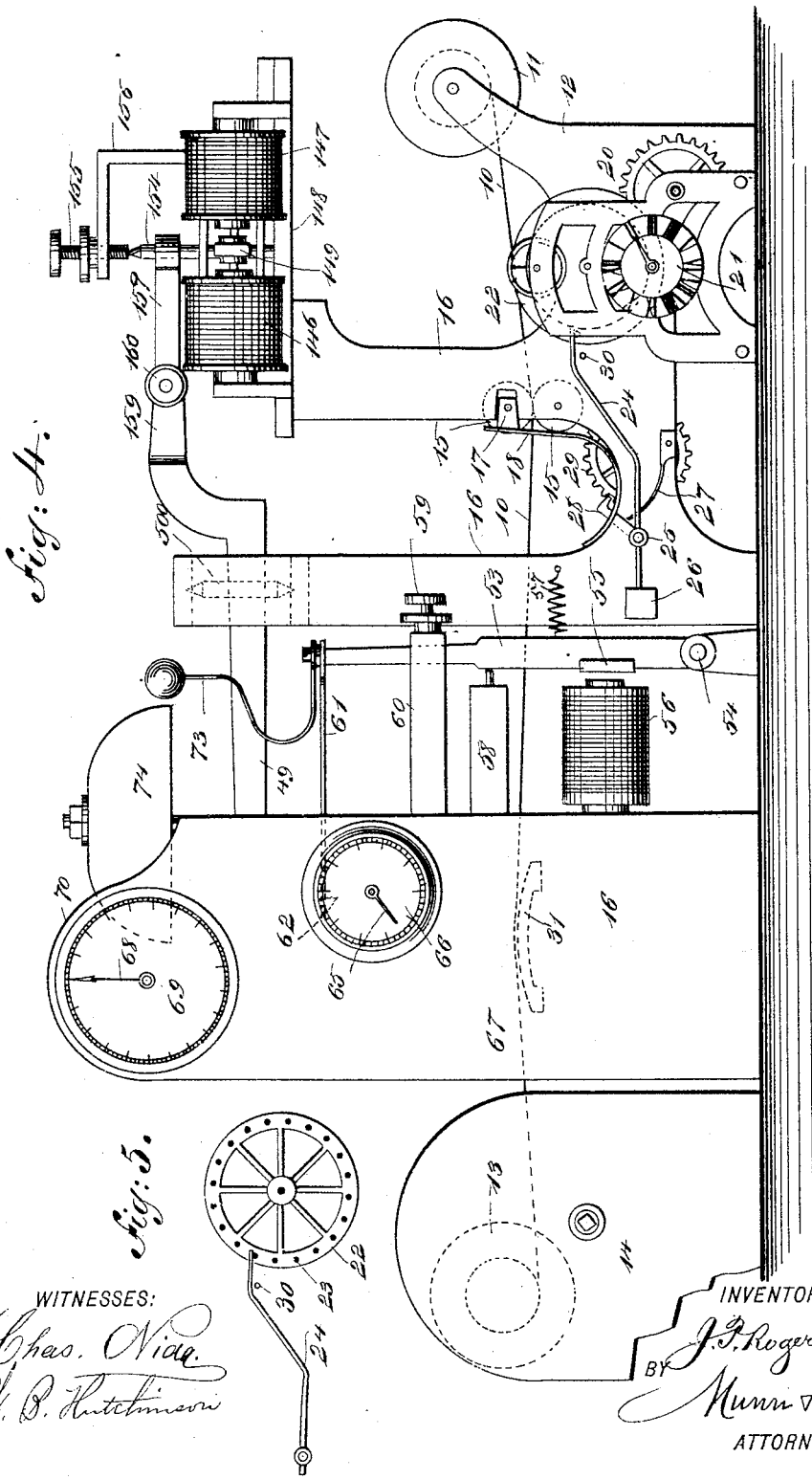
WITNESSES:
Chas. Nida.
N. P. Hutchinson
INVENTOR
J. P. Rogers
BY
Munn &Co
ATTORNEYS.

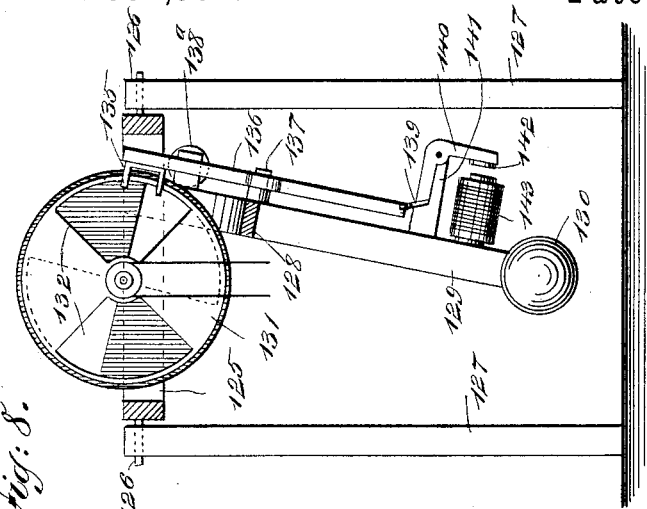

(No Model.) 5 Sheets—Sheet 5.
J. P. ROGERS.
RECORDING SHIP'S LOG AND COURSE INDICATOR.
No. 536,582. Patented Mar. 26, 1895.
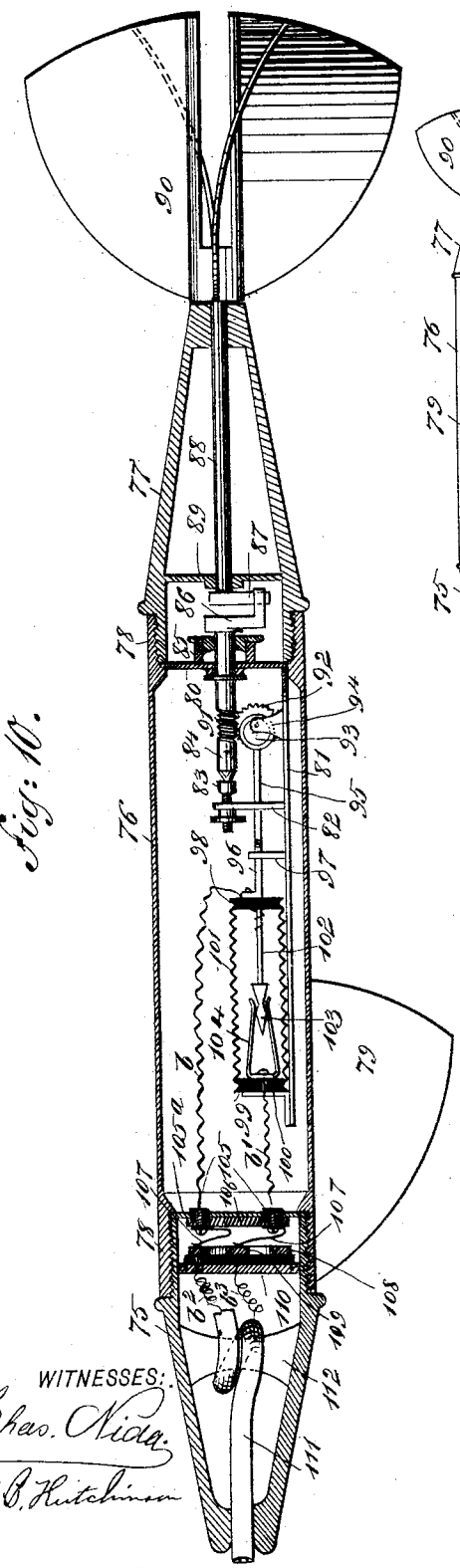
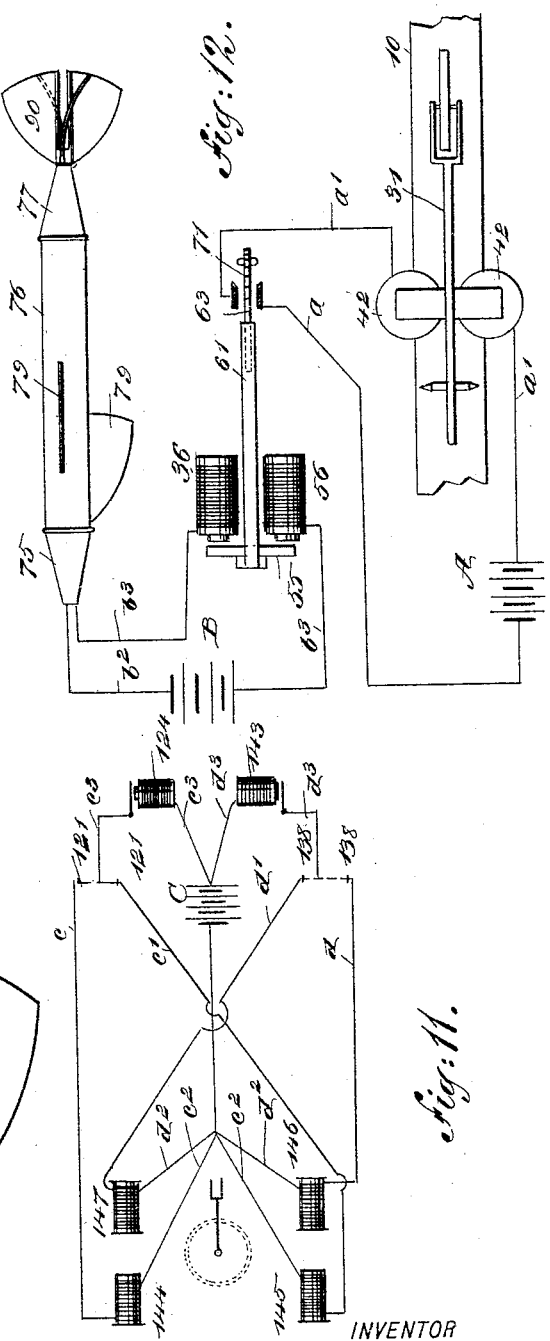
WITNESSES:
Chas. Nida.
W. B. Hutchinson
INVENTOR
J. P. Rogers
BY
Munn & Co.
ATTORNEYS.

UNITED STATES PATENT OFFICE.

JOHN P. ROGERS, OF MONCTON, CANADA, ASSIGNOR OF ONE-THIRD TO GEORGE WORRALL DANIEL, OF SAME PLACE.

RECORDING SHIP'S LOG AND COURSE-INDICATOR.

SPECIFICATION forming part of Letters Patent No. 536,582, dated March 26, 1895.

Application filed July 11, 1894. Serial No. 517,243. (No model.)

*To all whom it may concern:*

Be it known that I, JOHN P. ROGERS, of Moncton, in the county of Westmoreland, Province of New Brunswick, and Dominion of Canada, have invented a new and Improved Self-Registering Log and Course-Indicator, of which the following is a full, clear, and exact description.

My invention relates to improvements in ships' logs, such as are used for measuring distances; and the object of the invention is to produce an apparatus which includes a log capable of being towed behind a vessel in the usual manner, and also certain printing and registering mechanism carried on the vessel and which is adapted to automatically record, with absolute correctness, each mile and fractions thereof of a ship's run; which prints the mileage figures in such a way that at any time the deviation of the ship from the steered course may be accurately ascertained, whether the said deviation is caused by wind or current.

A further object of my invention is to provide electrically-operated means for controlling the printing and registering mechanism and to provide a reliable circuit breaker in the log proper which will be actuated to make and break the electrical circuits and set the controlling mechanism in operation.

To these ends my invention consists of certain features of construction and combinations of parts, which will be hereinafter described and claimed.

Reference is to be had to the accompanying drawings, forming a part of this specification, in which similar figures and letters of reference indicate corresponding parts in all the views.

Figure 1:
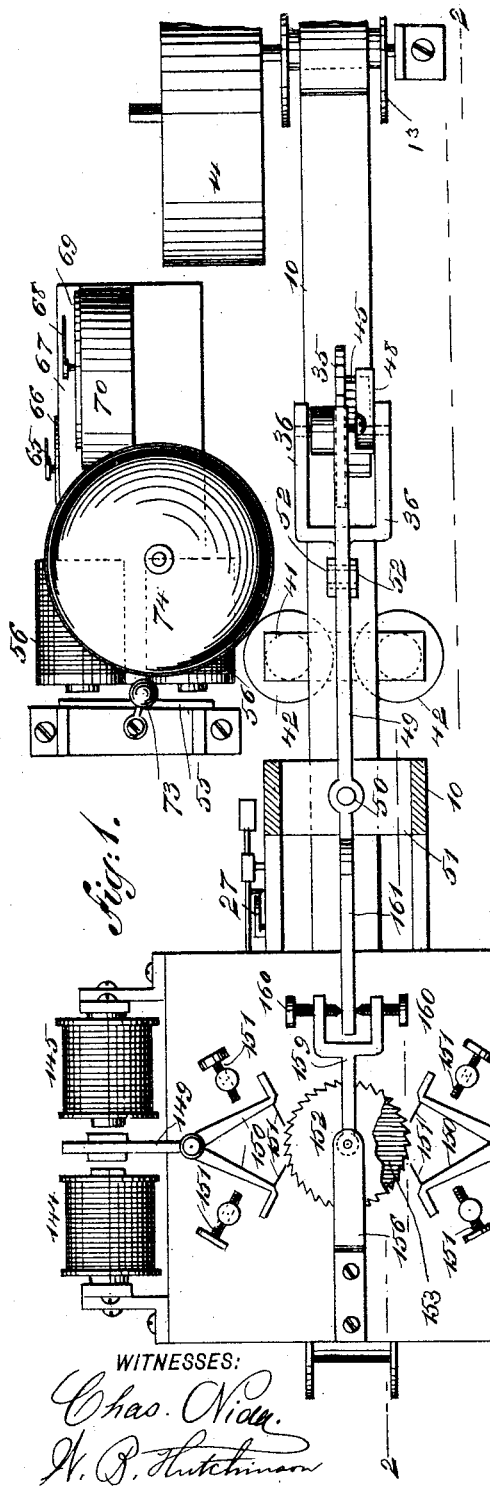
Figure 3:
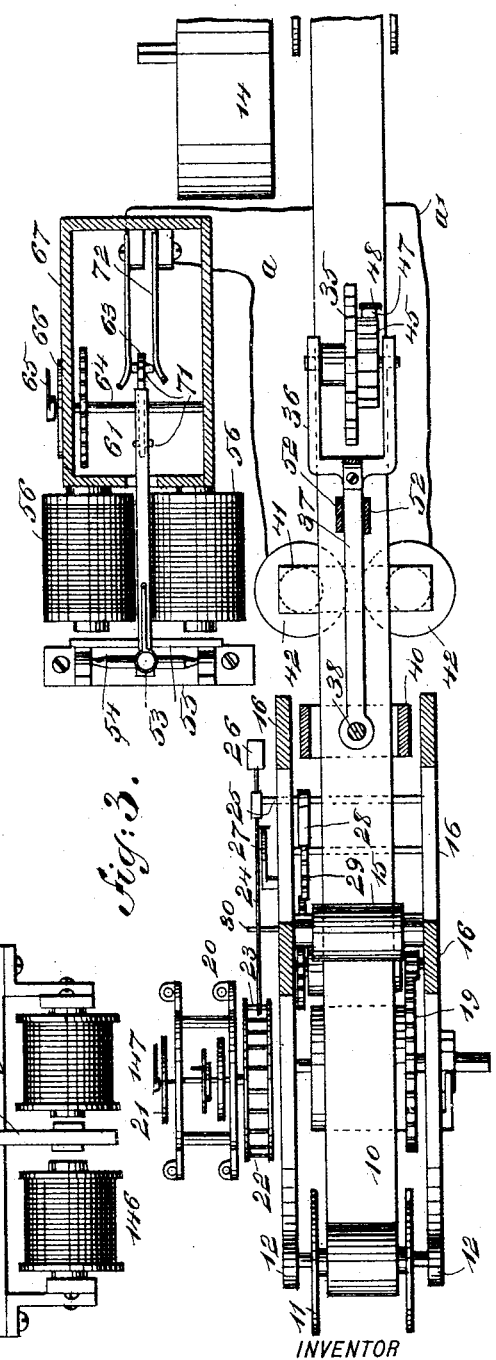

Figure 1 is a broken sectional plan view of the printing mechanism carried on the vessel and the electrically operated device for indicating the deviation of the ship. Fig. 2 is a longitudinal section on the line 2—2 of Fig. 1. Fig. 3 is a sectional plan on the line 3—3 of Fig. 2. Fig. 4 is a broken side elevation of the printing and registering apparatus. Fig. 5 is a detail view of the escapement for controlling the feed of the paper strip or tape on which the record is kept. Fig. 6 is an enlarged detail side elevation of the current indicating mechanism and the electrically operated means for conveying the deviation of the vessel due to the current, to the printing mechanism. Fig. 7 is a plan view of the current indicating mechanism shown in Fig. 6. Fig. 8 is an enlarged detail sectional elevation on the line 8—8 of Fig. 9, of the apparatus for indicating the deviation caused by wind. Fig. 9 is a plan view of the structure shown in Fig. 8. Fig. 10 is a detail longitudinal section of the log proper. Fig. 11 is a diagrammatic view of the electric circuit of the wind and current apparatus; and Fig. 12 is a diagrammatic view, showing the electric circuits between the log and the printing and registering mechanism.

The record is kept on a tape 10, preferably of paper, which is marked with a longitudinal central line and with lighter lines at regular distances on each side of the central line, the central line being preferably blue and the other lines red, and the paper is fed forward at a uniform rate of speed, and the distance the ship travels, is at regular intervals, printed upon the tape, so that by reference to the tape it may be known at any time the rate of the ship's progress. This printing is, under normal conditions, done on the central line of the paper, but if the ship deviates from the steered course the printing is done more or less to one side of the center, according to the amount of deviation and by means of the mechanism which will be hereinafter fully described. The extent of such deviation in either direction may be read accurately by means of the above mentioned blue lines.

The paper is fed from the wheel or spool 11, which is supported in arms 12, at one end of the printing apparatus, as shown in Fig. 2, and is wound upon a spool 13 at the opposite end of the apparatus, this spool being driven by clockwork contained in the case 14, but the clockwork is not illustrated, as it may be of any usual kind. The tape is fed forward between feed rolls 15, which are journaled in the main frame 16 of the printing apparatus, and for convenience the upper roll is removable, being held in place as illustrated, by lugs 17 which fit the slots in the frame 16, the lugs being carried by springs 18 secured to the frame, as shown in Fig. 4. Any convenient means, however, may be used for fastening the rolls in place. The feed rolls are driven by a clockwork 19, the movement of which is regulated by means of an escapement-like connection with a second clockwork 20, which connection will be described presently. This clockwork 20 has an ordinary dial 21, see Fig. 4, on which the time of day is indicated.

The clockwork 20 carries an escapement wheel 22, see Figs. 3 and 5, which is provided with cross pins 23, and these are adapted to engage one end of the escapement lever 24 which is secured to a shaft 25 journaled in the frame 16, and the lever is counterbalanced by a weight 26 and is normally pressed downward by a light spring 27. The shaft 25 carries a verge 28 which engages the escapement wheel 29 of the clockwork mechanism 19, and the rise and fall of the pawl regulates the movement of the clockwork 19 and consequently of the feed rolls. The lever 24 is oscillated by reason of its connection with the escapement wheel 22 being lifted successively by each cross pin 23 and dropping back against the stop pin 30.

From the feed rolls 15 the tape passes over a table 31, see Fig. 2, which is preferably adjustable vertically, and to this end it has a leg 32 which is movable up and down in a post 33, in which it is fastened by a set screw 34. The table 31 is arranged directly beneath the printing wheel 35, which is preferably arranged so as to print miles and half miles, but of course it may be arranged to print any necessary or desired fractions of miles. The printing or type wheel 35 is carried in the forked end 36 of a vertically moving lever 37, which is also adapted to swing laterally, whereby the printing may be effected on the tape at different points laterally thereof, so as to indicate the deviation from the course steered, and to this end a vertical pivot post 38 is secured to said lever and pivoted in the cross bars 39 of a bell crank armature lever 40, which is fulcrumed at its elbow, as shown in Fig. 2, and has on its lower arm an armature 41 which is arranged above magnets 42, through which an electric current is closed, as hereinafter described, and at each closing of the circuit the armature is pulled down, the bell crank 40 tilted, and the type wheel 35 moved downward upon the tape 10. The bell crank 40 is held normally so as to lift the type wheel, and to this end is has a depending arm 40$^a$ which is secured to a spring 40$^b$ held on an adjusting screw 40$^c$ which is adjusted by means of the nuts 40$^d$ and is mounted in a post 40$^e$ which has abutment screws 40$^f$ arranged in a bend 40$^g$ of the post, so as to be held above and below the lever 40 and limit its movement.

The type wheel is inked by a roller 43 held on supporting arms 44 which are secured to the arm or lever 37, and the type wheel is turned by means of a ratchet wheel 45 which has teeth corresponding to the number of type on the type wheel, and this ratchet wheel and type wheel are prevented from turning back by means of a detent 46. After the type wheel has been depressed to print and it is again raised, a tooth of the ratchet wheel strikes the tooth 47 on the spring arm 48 which is secured to the lever 49 above the type wheel, and thus the ratchet wheel and type wheel are turned a distance of one space, ready for the next printing.

The lever 49 is arranged so that it cannot swing vertically, but may swing laterally, and to this end it has a vertical pivoted post 50 fulcrumed in cross bars 51 of the main frame 16 and it has also depending arms 52 which straddle the lever 37 carrying the printing wheel, and as the lever 49 is deflected to the right or left by variations of wind and current in the manner to be hereinafter described, it imparts a similar movement to the lever 37 and causes the printing wheel to descend at the right hand or left hand of the center line on the tape 10.

The registering is effected by means of a tilting armature lever 53, which also serves to close the circuit through the magnets 42 and work the printing mechanism, as hereinafter described, this lever 53 being arranged vertically and pivoted at its lower end, as shown at 54, while on one side of it is secured an armature 55 which is arranged opposite the magnets 56 which serve to pull the lever in one direction while it is moved in the opposite direction by a spring 57. The movement of the lever is limited by the stops 58 and 59, the latter being in the form of screws held in a yoke 60 which embraces the lever 53, as shown in Fig. 4, but any equivalent means may be substituted.

The magnets 56 are energized by means of a battery whose circuit is controlled by mechanism in the log proper, to be hereinafter described, this mechanism being arranged to energize the magnets 56 and move the lever 53 at every fortieth of a mile, though of course this arrangement may be varied.

The lever 53 carries a horizontally extending spring arm 61, see Figs. 2 and 3, which has, at its free end, a tooth 62 to engage the ratchet wheel 63 which is secured to a shaft 64 carrying a hand 65 which moves over a dial 66 indicating miles and fortieths thereof, the dial being placed on a case 67 which contains the shaft 64, as shown in Fig. 2. The shaft 64 is also geared, by means of mechanism not shown, but which may be of any customary kind, to a hand 68 moving over a dial 69 on an extension 70 of the case 67, see Figs. 1 and 4, and this latter dial 69 may be made to indicate the whole number of miles traveled by the vessel up to several thousands.

One side of the wheel 63 is insulated, as shown in Fig. 3, and projecting through the insulation on diametrically opposite sides of the wheel are contact pins 71 which are adapted to engage the contact springs 72 which are arranged on opposite sides of the wheel and which are connected by wires $a$ and $a'$ with a battery A, see Fig. 12, and the printing magnets 42, so that at every half revolution of the wheel 63, which half revolution corresponds with a one-half mile traveled by the vessel, the circuit will be closed with the said magnets 42 and the bell crak 40 and printing or type wheel 35 actuated so as to print on the tape 10. The lever 53 also carries a hammer 73 which is adapted to strike an adjacent gong 74 every time the lever is actuated, and thus call attention to the fact that a fortieth of a mile has been traveled since the gong last struck.

The log proper which carries the mechanism for making and breaking the circuit in the magnets 56, is shown in detail in Fig. 10, and has a body made up for convenience in several sections, to wit: a bow section 75, a middle section 76, and a stern section 77, the bow and stern sections being preferably tapering, and the several sections are connected by screw couplings 78. The log is provided with fins 79 to prevent it from twisting in the water, and at the rear end of the middle section 76 is a transverse plate 80 which fits water-tight in the log and which has a forwardly projecting bracket 81 on which the circuit breaking mechanism is supported and which also supports the post 82 carrying the bearing 83 of the shaft 84, which also turns in a packing box 85 on the partition or plate 80, and the shaft 84 connects at its rear end by means of a crank 86 with a crank 87 on the driving shaft 88, which is journaled in a partition 89 in the stern section 77 of the log and projects through the stern of the log where it terminates in a screw 90 which, by turning, turns the shafts 88 and 84.

The parts 86 and 87 form, as will be readily seen, the members of a clutch adapted to automatically connect the shaft 88 with the shaft 84 when the sections 76 and 77 are screwed together.

The shaft 88 may be provided with a packing box where it passes through the partition 89, if desired. The shaft 84 is provided with a worm 91 which engages a worm wheel 92 carrying an eccentric 93, the eccentric and worm wheel being journaled in hangers 94 on the bracket 81, and the eccentric reciprocates an eccentric rod 95 which extends through a slot in the post 82 and is pivoted to a rod 96 sliding on a guide post 97 and connecting with an insulating plate 98 forming one end of a water-tight bellows-like case containing the circuit breaker, the other end of the case being formed by a similar plate 99 which is secured to a bracket 100 on the main bracket 81, and the two plates 98 and 99 are connected by the flexible wall 100$^a$ which is preferably of elastic rubber, and which, as before remarked, is water-tight.

The plate 98 carries a rod 102 which extends forward in the case 101 and terminates in a tapering head 103, which is adapted to enter between the contact springs 104 of the circuit breaker. It will thus be seen that when the eccentric rod 95 is retracted the circuit will be broken, and when it is advanced the circuit will be closed, and the parts are adjusted so that this takes place at every fortieth of a mile. The rod 102 connects, by a wire $b$, with one of the contact screws 105 which are insulated in the partition 105$^a$ at the front end of the middle section 76 of the log, and the springs 104 connect by a wire $b'$ with the other screw 105, these screws being used to attach the insulating plate 106 to the partition 105$^a$, and they also contact with the springs 107 which make contact with the ring 108 and contact block 109 which are insulated on the partition 110 in the bow section 75 of the log, and the ring and contact block connect with the wires $b^2$ and $b^3$ which pass through the towing cable 111 of the log, which towing cable is secured to a cross piece 112 in the log and passes out through the barrel of the log to the vessel, to which it may be made fast in any convenient way.

The wires $b^2$ and $b^3$ connect with a battery B and with the magnets 56, as shown in Fig. 12, and consequently every time the circuit breaker in the log completes the circuit it will be closed through the magnets 56 which will work the register, as previously described, and also close the circuit through the magnets 42, as described above, and the printing and registering will thus be simultaneously effected.

The tow line or cable 111, where it passes over the stern of the vessel, goes through an eye 113$^a$ on a lever 113, see Fig. 6, which for convenience is jointed or hinged, as shown at 114, and is pivoted at 115 in order that it may swing laterally, and thus any lateral inclination of the tow line will communicate itself to the lever. On the front end of the lever is a bracket plate 116 on which is centrally pivoted, as shown at 117, a contact lever 118, which at its front end is adapted to engage a rack 119 carried by an elbow lever 120, this being pivoted at its elbow, as shown at 121 on a supporting post 122, and the upper arm of the lever has an armature 123 thereon which is placed above the magnets 124.

The contact lever 118 is held normally central by light springs 119$^a$, see Fig. 7, and at its rear end it has a contact pin 120$^a$ which is adapted to touch the contact screws 121$^a$ and thus close the circuit through the current indicating mechanism to be hereinafter described, and also through the magnet 124. As soon as the circuit is closed through the magnets they depress the armature 123, thus tilting the lever 120 and lifting the rack 119 from the arm 118 and the latter centers itself and breaks the circuit, but if the tow line continues to deviate, the arm is again tilted, thus reactuating the indicating mechanism and closing the circuit, as above specified.

The wind instrument is connected with the instrument to indicate leeway in substantially the same manner as the current indicator, and will therefore be described before the circuits of either are followed out. The wind indicating device is shown in Figs. 8 and 9, and it has a horizontal frame 125 which has trunnions 126 pivoted in supporting posts 127, the frame being held horizontal by means of the fork 128 and its shank 129, the two forming a lever which has, at its lower end, a counter-balancing weight 130. The wind disk 131 is hung in the frame 125, so as to be parallel with the keel of the vessel, this disk being preferably constructed like an ordinary circular damper with holes 132 which may be opened or closed, as described, so that the disk may offer the requisite resistance to the wind. The disk is mounted loosely on the shaft 133, see Fig. 9, and is pressed normally into a central position by light spiral springs 134, which encircle the shaft 133. The disk 131 at one edge engages a fork 135 on the contact arm 136, which is fulcrumed on the lever 128, 129, at 137 and which is provided with a contact pin 138 to engage the contact screws 138ª which are in engagement with the leeway indicating mechanism, to be hereinafter described, and when the disk is moved to one side or the other it brings the pin 138 into engagement with one of the screws 138ª and thus closes the circuit, as will appear below.

The contact arm 136 is like the contact arm 118 and it, in a similar way, engages a rack 139 carried by the elbow lever 140, which rack and lever are like those previously described, and the lever 140 is supported on an arm 141 of the lever 128, 129, and carries an armature 142 which is arranged opposite the magnets 143 on the shank 129 and thus, when the magnet is energized, the armature is pulled, the lever 140 is tilted, the rack 139 released and the arm 136 again permitted to shift, as before.

The contact screws 121ª of the current indicator are connected by wires $c$, $c'$ and $c^2$ with magnets 144 and 145 and with a battery C, which, by means of a wire $c^3$ connects with the setting magnet 124, as shown in Fig. 11, and the contact screws 138 of the contact arm 136 connect by wires $d$, $d'$ and $d^2$ with magnets 146 and 147 and by a wire $d^3$ with the setting magnet 143 of the wind instrument. These magnets 144, 145, and 146, 147, are oppositely arranged in pairs, as shown clearly in Fig. 1, and between each pair of magnets is arranged an oscillating armature lever 149, each lever being pivoted on a table 148 to which the magnets are secured, and the levers have, at their inner ends, diverging arms 150 with spring teeth 151 thereon, which are adapted to engage the ratchet wheels 152 and 153, see Fig. 2, of the pivot post 154 which is journaled on the table 148 and in bearing screws 155 in a bracket 156. These ratchet wheels 152 and 153 have teeth of opposite pitch and the teeth 151 of each lever 149 are arranged to engage different ratchet wheels so that when the lever 149 is turned in one direction it turns the shaft or post 154 one way, and when the lever is turned in the opposite direction it has a similar effect on the shaft. The shaft is also provided with a cog wheel 157 which is engaged by a click 158 on the table 148, said click serving to hold the shaft against accidental movement, but permitting it when actuated by the devices above described to turn in either direction. The post 154 carries a fork 159 which has centering screws 160 held in opposite sides of the fork and in engagement with the rearwardly-extending end 161 of the lever 49 which has been previously described as shifting the printing lever 37 so as to make the type wheel 35 descend on one side or the other of the center of the tape 10 accordingly as the vessel deviates in one direction or the other from the course steered.

It will be clearly understood from the description of the log and its circuit breaking mechanism, that every fortieth of a mile the closing of the circuit will energize the magnets 56 and set the registering mechanism at work, and will also close the circuit through the magnets 42 and work the printing apparatus. If now the deviation of the log line 11 is such as to materially shift the lever 113, the contact arm 118 on the said lever will come into engagement with one of the contact screws 121ª and the circuit will be closed through one of the magnets 144 and 145 and also through the setting magnet 143 which releases the contact arm 118 from the rack 119, as specified, and permits the contact arm to again swing so as to close the circuit. When the circuit is closed through one of the magnets 144 or 145, it causes the lever 149, see Fig. 1, to be shifted and one of the teeth 151 engages one of the ratchet wheels 152 or 153 and turns the post 154 and the fork 159 to the right or left, as the case may be, thus acting on the tail or extension 161 of the lever 49, and the latter, by means of the arms 52, shifts the printing lever 37 and the type wheel 35, and the type wheel descends at a point off the center of the tape 10 and thus, by referring to the tape, not only can the distance which the ship has traveled in a certain time be determined but the deviation due to the current.

If the log line should be deflected by the wind, it would have the effect above described, unless provision were made to obviate this, and thus the record on the tape would be misleading; but to guard against this the wind instrument described is used and the disk 131 of the said instrument may be adjusted so far as to offer the necessary resistance to the wind. When the wind blows sufficiently to effect the log line it also moves the disk 131 on its shaft 133, and brings the contact pin 138 into engagement with one of the contact screws 138ª, thus closing the circuit through one of the magnets 146 and 147 and also through the setting magnet 143, the current passing from the battery C through the wires $d$, $d'$ $d^2$, and $d^3$, see Fig. 11, and the energizing of one of these magnets 146 or 147 causes the lever 149 between them to be actuated at the same time the opposite lever is actuated by the magnets 144 or 145 and, as the levers 149 are oppositely arranged and both simultaneously actuated, it follows that there will be no movement of the post 154 and lever 49 and thus the effect of the wind on the log line is counteracted by the disk 131 and the electrical connections described.

It will be seen that if the movements of the two levers 149 should not be exactly coincident, the effect would be the same, for one lever would turn the post 154 one way while the other lever would, at almost the same instant, turn the post back so that in either case there would be practically no movement.

It will be understood from the foregoing description that a good deal of the apparatus may be greatly changed in structure without materially affecting the principle of the invention, and that many forms of electrical connections may be used with the result above noted, and I therefore do not confine my invention to the mechanism illustrated and described.

Having thus described my invention, I claim as new and desire to secure by Letters Patent—

1. In an apparatus of the character described, an electrically-actuated registering mechanism, a circuit-closer controlled by said registering-mechanism, an electric circuit including the circuit-closer, a magnet in the circuit, an armature-lever carrying an armature in inductive proximity to the magnet, a printing-table, means for feeding a tape across the same, and a type-wheel carried by said armature-lever and adapted to print on the tape over said table, substantially as set forth.

2. In an apparatus of the character described, an electrically-actuated registering mechanism, a circuit-closer controlled thereby, an electric circuit including the circuit-closer, a magnet in the circuit, an armature-lever carrying an armature for said magnet, a printing-table, a tape, mechanism for feeding the tape across the table in a regulated manner, and a type-wheel carried by the armature-lever and adapted to print on the tape over the table, substantially as set forth.

3. In an apparatus of the character described, a registering mechanism adapted to register the distance traveled, a printing mechanism actuated from said registering mechanism and adapted to record the indications thereof, said printing mechanism comprising a table and a type-wheel, a tape, and means for feeding said tape through the printing mechanism in a regulated manner, substantially as set forth.

4. In an apparatus of the character described, a registering mechanism adapted to register the distance traveled, a printing mechanism actuated from the registering mechanism and adapted to record the indications thereof, said printing mechanism comprising a table and a type-wheel, a tape, and clock-work adapted to feed said tape through the printing mechanism in a regulated manner, substantially as set forth.

5. In an apparatus of the character described, a registering mechanism, a circuit-closer consisting of a wheel adapted to be turned by the movement of the registering mechanism and having one side covered with insulating material and provided with a contact-point projecting through said insulation, and a contact-spring adapted to contact electrically with said contact-point when the wheel is turned, a circuit including the contact-point and spring of said circuit-closer, a magnet in said circuit, an armature and a printing device actuated by the movement of the armature, substantially as set forth.

6. In an apparatus of the character described, an electric circuit, a magnet and circuit-closer therein, an armature and armature-lever for the magnet, a registering mechanism, a ratchet-wheel on the shaft thereof and having one face covered with insulating material and provided with a contact-point projecting through the same, a contact-spring adapted to contact with the contact-point when the ratchet wheel is turned, a toothed arm carried by the armature-lever and adapted to turn said ratchet-wheel, an electric circuit including the contact-point and said contact-spring, a magnet in said circuit, an armature, and a printing mechanism actuated from the movement of said armature, substantially as set forth.

7. In an apparatus of the character described, a printing mechanism comprising an electric circuit including a generator, a circuit-closer and a magnet, an armature and armature-lever for the magnet, a printing-table, a tape, means for feeding the tape across the table, a type-wheel lever connected to and movable with the armature-lever and adapted for movement in a plane at angles with that in which the armature-lever moves, a type-wheel carried on said type-wheel lever and adapted to print on the tape, and means for moving said type-wheel lever independently of the armature-lever, substantially as set forth.

8. In an apparatus of the character described mechanism to indicate the distance traveled, a printing mechanism actuated from the distance indicating mechanism and comprising a table and a printing surface, a tape, means for feeding the tape through the printing mechanism and means independent of the distance-indicating mechanism for shifting the printing point laterally of the tape, substantially as set forth.

9. In an apparatus of the character described, mechanism to indicate the distance travelled, a printing mechanism actuated from the distance indicating mechanism, and comprising a table and a printing surface, a tape, means for feeding the tape through the printing mechanism, mechanism for indicating leeway, and means, actuated from said leeway indicating mechanism, for shifting the printing point laterally of the said tape, substantially as set forth.

10. In an apparatus of the kind described, the printing mechanism comprising a table, a tape, clockwork mechanism for feeding the tape across the table, a depressible and horizontally swinging type wheel above the table, electrically operated means for depressing the type wheel, the log, and means for moving the type wheel to the right or left by the deviation of the log line, substantially as described.

11. In an apparatus of the kind described, the combination, with the depressible and horizontally swinging type wheel, of a laterally swinging lever arranged above the type wheel, an operative connection between the lever and the type wheel, whereby the latter is moved laterally, the log, and mechanism for tilting the lever by the deviation of the log line, substantially as described.

12. In an apparatus of the kind described, the printing mechanism comprising a depressible and horizontally swinging lever, a type wheel carried thereby, means for depressing the lever at regular intervals, a second lever arranged above the first lever and adapted to swing outward, connections between the two levers whereby the movement of the second will be imparted to the first, the log, and electrically operated mechanism set in operation by the deviation of the log line and adapted to swing the second lever, substantially as described.

13. In an apparatus of the kind described, the combination, with the laterally movable and depressible type wheel, of the log having a suitable line, means for moving the type wheel sidewise, in one direction, by the deviation of the log line, a wind disk held to slide on its support, and means for moving the type wheel sidewise in the opposite direction by the movement of the wind disk, substantially as described.

14. The combination, with the depressible and laterally swinging type wheel, of the log having a suitable line, electrically controlled mechanism for moving the type wheel sidewise in one direction, means for making and breaking the circuit in said mechanism by the deviation of the log line, a wind disk, a second set of electrically operated mechanism for moving the type wheel sidewise in the opposite direction, and means for making and breaking the second circuit by the movement of the wind disk, substantially as described.

15. In an apparatus of the kind described, the combination, with the printing mechanism, the laterally swinging lever arranged to move the type wheel of the printing mechanism sidewise, an oscillating post connected with the said lever, oppositely pitched ratchet wheels on the post, oppositely arranged armature levers, each provided with teeth to engage the two ratchet wheels, oppositely placed magnets to work the armature levers, the log having a suitable line, means for closing the circuit through one set of magnets by the inclination of the log line, the wind disk held to slide in the wind, and means for closing the circuit through the second set of magnets by the movement of the wind disk, substantially as described.

16. The combination, with the printing mechanism for a depressible and laterally movable type wheel, of electrically operated means for moving the wheel laterally, a laterally swinging lever, a log having a line connected with said lever, and a circuit breaker operated by the movement of the lever and adapted to control the circuit in the mechanism for moving the type wheel laterally, substantially as described.

17. The combination, with the depressible and laterally movable type wheel, of the electrically controlled mechanism for moving the type wheel laterally, a log having a suitable line, the swinging lever in connection with the line, a contact arm on the lever, adapted to make and break the circuit through the type wheel controlling mechanism, a rack to engage the contact arm, and a magnet in circuit with the type wheel controlling mechanism to release the rack, substantially as described.

18. The combination, with the depressible and laterally movable type wheel, of the electrically operated mechanism for moving the type wheel laterally, the wind disk arranged to slide in the wind, and circuit closing mechanism actuated by the movement of the wind disk and arranged to close the circuit through the type wheel controlling mechanism, substantially as described.

19. The combination, with the depressible and laterally movable type wheel and the electrically controlled mechanism for moving the type wheel laterally, of the oscillating counterbalanced frame, the wind disk journaled in the frame and adapted to move laterally, and means for making and breaking the circuit in the type wheel controlling mechanism by the movement of the wind disk, substantially as described.

20. In an apparatus of the kind described, the circuit breaker in the log, comprising a water-tight flexible case having rigid ends, contact springs held on one end of the case, the contact rod held on the opposite end of the case and adapted to enter between the springs, and mechanism for moving the rod into and out of contact with the springs, substantially as described.

21. In an apparatus of the kind described, the combination, with the hollow log, the revoluble driving shaft and the screw for turning the shaft, of the circuit closer in the log comprising a flexible water-tight case having rigid ends, contact springs fastened to one of said ends, a contact rod fastened to the opposite end of the case and adapted to move into contact with the springs, and an eccentric and gear connection between the movable end of the case and the driving shaft, substantially as described.

JOHN P. ROGERS.

Witnesses:
LESLIE GORDON BAXTER LAWSON,
CHIPMAN A. STEEVES.